Dec. 4, 1962   J. S. FISHMAN   3,066,716
SOLID OR NON-PNEUMATIC TIRE
Filed April 17, 1961
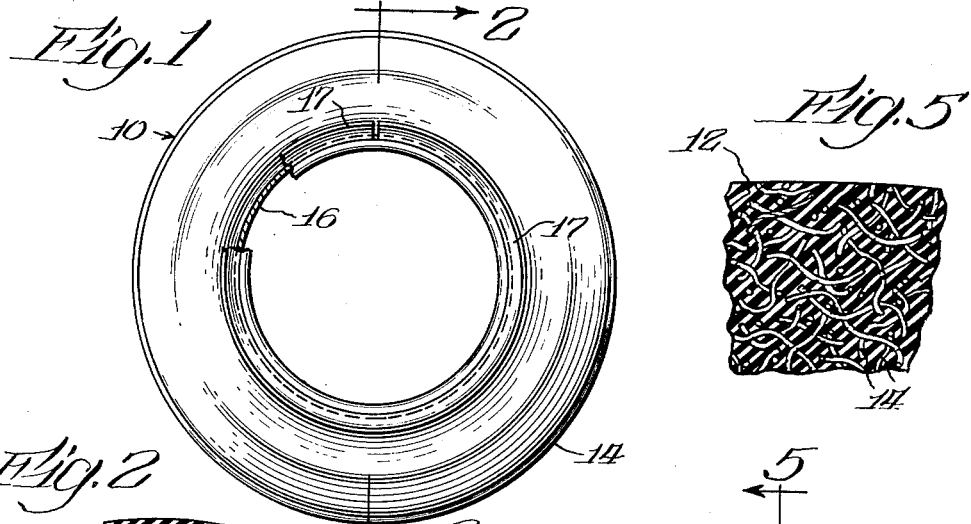
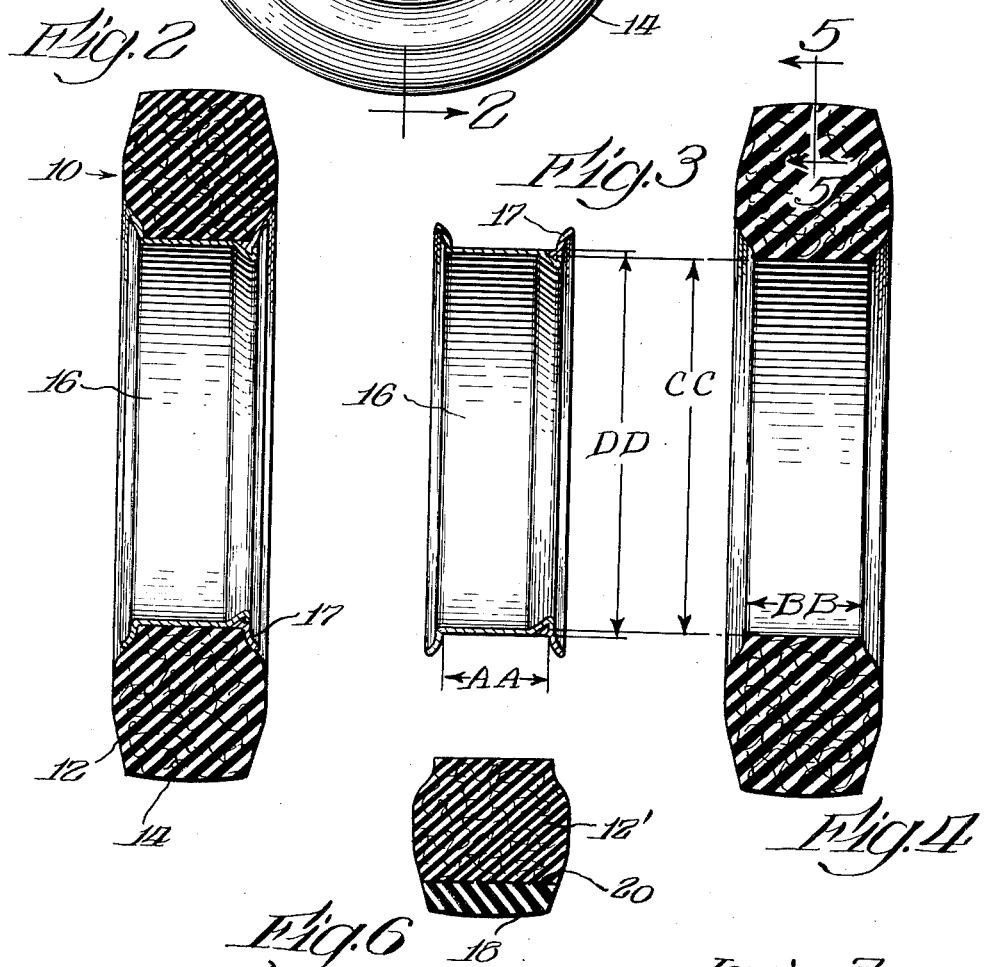
Inventor:
Jordan S. Fishman
By Max R. Kraus Atty.

United States Patent Office 3,066,716
Patented Dec. 4, 1962

3,066,716
SOLID OR NON-PNEUMATIC TIRE
Jordan S. Fishman, 442 W. Garfield Blvd., Chicago, Ill.
Filed Apr. 17, 1961, Ser. No. 103,594
2 Claims. (Cl. 152—323)

This invention relates to improvements in solid or non-pneumatic tires.

One of the objects of this invention is to provide a solid or non-pneumatic tire which may be mounted on conventional pneumatic tire rims, particularly those tire rims which have a standard flat base or rims which have a semi-drop center and a locking ring, and which tire will not slip or rotate with respect to the rim and will be retained on the rim.

Another object of this invention is to provide a solid tire that need not be vulcanized or molded directly to a specific rim, but which is molded and then may be subsequently mounted on a conventional rim.

Another object of this invention is to provide a solid tire so constructed that it will not become distorted, will be of sturdy construction and will last a long time.

Solid tires now in use are insufficient in many ways; they are made principally to fit on special rims and are molded thereon. They will not fit conventional pneumatic tire rims. The solid tires are now manufactured by molding rubber on a steel band for a given size truck, with the steel rim then placed in a receptacle which must be installed on the truck to hold the wheel. With this invention there is provided a solid tire which eliminates the aforementioned type of mounting and the need of the usual type of press on solid tires. Other solid tires are constructed with annular metal rings or bands therewithin, so that the tire will be retained on the rim. The continuous flexing of the metal will cause the rings or bands to break. The foregoing objectionable features are all overcome with the present invention.

Other objects will become apparent as this description progresses.

In the drawings:

FIGURE 1 is an elevational view of a tire of this invention mounted on a conventional rim having a lock ring.

FIGURE 2 is a cross-sectional view taken on line 2—2 of FIGURE 1.

FIGURE 3 is a view of the rim on which the tire is mounted.

FIGURE 4 is a sectional view of the tire.

FIGURE 5 is a sectional enlargement taken on lines 5—5 of FIGURE 4, and

FIGURE 6 is a sectional view of a modification.

Applicant recognizes that the prior art, for example, Patents No. 1,000,781 and No. 1,768,348 teach the manufacture of pneumatic or other vehicle tires by combining short lengths of fiber or cord with rubber in the vulcanization process. In Patent No. 1,000,781, short lengths of twisted cotton are used; long lengths are not recommended. In said patent the mixture of threads and dough or plastic composition is rolled into sheets where the threads tend to arrange themselves with their lengths in the direction of rolling, and in forming the tire several layers are combined and so arranged that the direction of rolling of the different layers lie at right angles to one another. The proportion of thread is between 20% and 30% to 70% and 80% of rubber.

In Patent No. 1,768,348 the tire is vulcanized upon a metallic base band or if the band is eliminated circumferentially disposed wires are imbedded inside the body of the tire. Also, the body is provided with fibers which are arranged in zones within the body and same are not uniformly distributed. So far as applicant is aware, these patents and others of like character have not solved any problems inherent in the construction of solid tires, nor do they disclose a solid tire which will perform as does applicant's tire. The metal band in said prior art tire will have a tendency to break, due to continuous flexing. Also, there are adhesion problems between the rubber and metal.

The present invention utilizes the intermixture of cord and the plastic composition but in a different arrangement and in different proportions from that disclosed by said patents, and combined with the dimensions of certain parts of the tire in relation to the standard rim on which it is mounted, the tire of the present invention accomplishes objects and achieves results not attainable by the prior art.

The rubber or plastic composition used in the vulcanization process is well known and is standard in the industry. This rubber or plastic composition is combined with the cord, which may be either nylon, rayon, cotton, or the like, in one mass by the use of a conventional rubber mill which consists essentially of two large rollers into which the material is fed. One of the rollers rotates faster than the other, thereby providing a mixing action between the plastic composition and cord. Other types of structures for accomplishing this intermixture may be used. All processing involved is standard in the industry and is well known to those skilled in the art.

The cords which are utilized in this invention are each preferably of a minimum length of one inch up to several inches, and the proportions should be approximately 50% cord and 50% plastic composition. This mass mixture is discharged from the mill in a sheet of approximately ½ inch thickness and of any desired length. The sheet is rolled around a fixture to build up the desired weight and size, and is then placed in the open half of a tire mold. The mold is placed in a hydraulic press with heated platens, which is of conventional construction used in the industry, and when the press is closed, pressure is exerted on the mass within the mold which forces the mass into the cavities in the mold and it is there heated by plates on the press. The mass is kept in the mold for a period of time, which depends on the size and weight of the tire, and then removed in the shape of the resultant solid tire, as shown in the drawings.

While the molds used in the manufacture of this tire are of conventional design, they are nevertheless special in that the walls of the mold are at least one inch thick. This is necessary due to the extreme pressure which is exerted by the hydraulic press in closing the mold around the solid raw rubber at the inception of pressing and by the gasses which are generated by the curing of the rubber after the initial press. It is possible to use a lighter mold but a mold with the aforementioned thick wall is preferable.

While applicant is fully conversant with the commercial practices employed, applicant believes that to his knowledge no one has made a solid tire to fit on a pneumatic rim which has the great weight of the tire produced in accordance with this invention. This is an advantage in that it gives a light weight truck increased stability for it lowers the center of gravity for the vehicle. It also eliminates the practice of having to fill a pneumatic tire with water or other materials to increase the weight, which is a common practice with the large pneumatic earthmover tires.

In accordance with this invention the length of the cords vary from a minimum of one inch to eight to ten inches in length. During the compressing process while in the mold, the intermixing of the layers takes place and the cords will be criss-crossing in the homogenous mass. This is an important feature since it produces a single mass which will wear evenly and will not separate. Such characteristics are not found in the solid tires presently commercially produced. The cavities and shape of the resultant tire in accordance with this invention may change, depending on the application such as a wide tire for soft ground and a narrow tire for easier lighter jobs.

As best seen in FIGURES 2 and 4, the tire generally designated at 10 is formed to comprise a homogenous mass body 12 with cords 14 criss-crossing in the homogenous mass. The cords are of the length heretofore described.

In accordance with this invention the tire 10 is molded of a size relative to the standard pneumatic rim to which it is to be ultimately applied. Said standard pneumatic rim 16 is shown in FIGURES 2 and 3 with the lock ring 17 applied thereon. The line A—A in FIGURE 3 indicates the width of the rim which includes the lock ring applied thereon, therefore the width of the tire across the base of the tire, indicated by the lines B—B in FIGURE 4, should be greater, approximately by ¼ of an inch to ½ inch depending on the size of the tire, than the width A—A of the rim into which the base of the tire fits.

The base of the tire is compressed within the rim, including the lock ring. Also, the inside diameter of the molded tire 16, indicated by the lines C—C, is less than the inside diameter D—D of the rim, for example, the inside diameter C—C of the molded tire is ⅜ to one inch less than the diameter D—D of the rim.

The tire constructed in accordance with this invention does not have a tendency to flake or disintegrate under pressure since it is one mass. This provides tremendous strength which can handle the extremely heavy weights encountered by this type of tire. By the use of this homogenous structure this tire is able to carry up to twice the weight carried by standard pneumatic tires when used in the slower moving operations which this tire is utilized for.

The molded tire of this invention may be kept in stock without being mounted on the rim or may be mounted on a rim of the size described by the use of a hydraulic press after which the lock ring 17 is applied. The base B—B of the tire will be compressed between the side walls A—A of the rim and lock ring and the tire will be stretched across its inside circumference C—C when on the rim so that the tire cannot slip on the rim, nor can it be accidentally removed from the rim. The tire will be kept on the rim and by virtue of its construction will not stretch very much. It will however stretch to a degree but because of the memory of the rubber and the inability of the cord to stretch it will try to keep its original dimensions and shape. This makes for a tight fit on the rim. Because of the cord, the rubber combination becomes very hard, which also makes for a tight fit on the rim. All these combinations help to hold the tire on the rim.

FIGURE 5 shows a modification in which the tread area indicated at 18, of the tire is formed of pure rubber or an 80% to 90% rubber compound, to a depth of one to four inches, depending upon the size of the tire. This tread will double the life of the tire, as well as provide a greater tractive force to the tire. The balance of the tire, namely, the cord base designated by the numeral 12′ is formed and constructed precisely as that previously described in connection with the body 12 in FIGURES 1 to 4 inclusive. It should be noted that there is a definite line designated by the numeral 20 between the cord base 12 of the tire, which is formed as previously described, and the tread 18, the cord base being essential to hold the tire on the rim. The soft rubber tread 18 will also provide a softer, easier ride and prevent jarring to the driver and truck.

It will be understood that various changes and modifications may be made from the foregoing without departing from the spirit and scope of the appended claims.

What is claimed is:

1. The combination which comprises a solid tire and a rigid metal rim, the tire being received over and frictionally engaged upon the rim, said rim comprising a generally cylindrical body portion and flanged portions extending radially outward of said body portion, said flanges defining the width of said rim, said tire comprising a vulcanized body portion constituting a shape-retaining, resilient unitary mass formed of a plastic composition having the physical properties of rubber randomly intermixed with fibrous cords of lengths lying in the range between one inch and ten inches, a substantial part of such cords being several inches or more in length, said cords being criss-crossed in the unitary mass, the proportions of plastic composition and fibrous material being approximately equal, said tire being molded to have, when not pressure-deformed, a width at its inner portion somewhat greater than the width of said rim and an inside diameter slightly smaller than the outer diameter of the body portion of said rim, said tire, when mounted on said rim, being under radial tension and axial compression.

2. The apparatus defined in claim 1 wherein the tire is provided with a circumferential outer tread layer containing substantially no fibrous material and being formed of substantially pure plastic composition.

References Cited in the file of this patent

UNITED STATES PATENTS

| | | |
|---|---|---|
| 1,000,781 | Collier | Aug. 15, 1911 |
| 1,082,647 | Parrish | Dec. 30, 1913 |
| 1,619,590 | Tanner | Mar. 1, 1927 |
| 1,737,133 | Wescott | Nov. 26, 1929 |
| 1,768,348 | Wescott | June 24, 1930 |
| 1,943,881 | Ware | Jan. 16, 1934 |
| 2,089,986 | Schmidt | Aug. 17, 1937 |

FOREIGN PATENTS

| | | |
|---|---|---|
| 447,428 | France | Oct. 28, 1912 |